US012613022B2

(12) United States Patent
Xu et al.

(10) Patent No.: US 12,613,022 B2
(45) Date of Patent: Apr. 28, 2026

(54) LENS AND LED LAMP HAVING THE SAME

(71) Applicant: SHENZHEN SNC OPTO ELECTRONIC CO., LTD., Shenzhen (CN)

(72) Inventors: Jianyong Xu, Shenzhen (CN); Zhikeng Mo, Shenzhen (CN); Liang Wang, Shenzhen (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/967,700

(22) Filed: Dec. 4, 2024

(65) Prior Publication Data

US 2026/0049706 A1 Feb. 19, 2026

(30) Foreign Application Priority Data

Aug. 16, 2024 (CN) ......................... 202421986897.5

(51) Int. Cl.

| | |
|---|---|
| ***F21V 5/00*** | (2018.01) |
| ***F21V 14/06*** | (2006.01) |
| ***F21V 17/10*** | (2006.01) |
| ***F21V 23/00*** | (2015.01) |
| ***F21V 23/04*** | (2006.01) |
| ***F21V 29/70*** | (2015.01) |
| *F21Y 115/10* | (2016.01) |

(52) U.S. Cl.

CPC .............. *F21V 5/008* (2013.01); *F21V 14/06* (2013.01); *F21V 17/104* (2013.01); *F21V 23/009* (2013.01); *F21V 23/04* (2013.01); *F21V 29/70* (2015.01); *F21Y 2115/10* (2016.08)

(58) Field of Classification Search

CPC ........ F21V 5/008; F21V 14/06; F21V 17/104; F21V 23/009; F21V 23/04; F21V 29/70

See application file for complete search history.

(56) References Cited

U.S. PATENT DOCUMENTS

| | | | | |
|---|---|---|---|---|
| 5,068,768 A * | 11/1991 | Kobayashi | F21S 41/635 362/268 |
| 5,555,492 A * | 9/1996 | Feger | F21S 43/255 362/268 |
| 11,781,738 B2 * | 10/2023 | Seronveaux | F21S 8/086 362/257 |
| 2009/0122547 A1 * | 5/2009 | Hou | F21V 14/06 362/277 |
| 2011/0280018 A1 * | 11/2011 | Vissenberg | F21V 5/007 362/277 |
| 2016/0186968 A1 * | 6/2016 | Edwards | F21K 9/64 362/84 |
| 2025/0243987 A1 * | 7/2025 | Xu | F21V 5/007 |

* cited by examiner

*Primary Examiner* — Tracie Y Green
*Assistant Examiner* — Michael Chiang

(57) ABSTRACT

A lens used for cooperating with a light source includes a lens body including a first surface and a second surface that are opposite to each other, an outer lens provided on the first surface, an inner lens provided on the second surface and corresponding to the outer lens. The outer lens and the inner lens are substantially strip-shaped, the inner lens protrudes towards the light source, the outer lens protrudes away from the light source, light emitted by the light source is firstly scattered by the inner lens, and then is converged by the outer lens and emitted to an external environment. An LED lamp is further provided.

3 Claims, 6 Drawing Sheets

LENS AND LED LAMP HAVING THE SAME

CROSS-REFERENCE TO RELATED APPLICATIONS

The present application claims priority of Chinese Patent Application No. 202421986897.5, filed with the Chinese Patent Office on Aug. 16, 2024, and entitled "LENS AND LED LAMP HAVING THE SAME", the entire content of which is incorporated herein in its entity.

TECHNICAL FIELD

The present disclosure relates to the field of lighting devices, and in particular relates to a lens and an LED lamp having the same.

BACKGROUND

LED lamps have many advantages such as energy-saving, environmental protection, long life and so on, and have been widely used in various lighting places. The conventional LED lamp generally includes a lens plate, and the lens plate is generally fixed to a heat dissipation base by screws. Due to a large number of screws and the need to use a screwdriver, the assembly of the lens plate is slow and inconvenient, the efficiency is low, and the labor cost is high. since different countries or different places of use have different requirements for light distribution, users may replace different types of lens plates according to their own needs. At this time, if a screwdriver is needed to disassemble the lens plate, which is very inconvenient for the user. In addition, the lens plate only has one light output angle. When a light angle of the LED lamp needs to be adjusted, the lens plate needs to be replaced according to different requirements, which increases the cost of purchasing the lens plate.

SUMMARY

Accordingly, a lens and an LED lamp are provided.

A lens used for cooperating with a light source includes a lens body including a first surface and a second surface that are opposite to each other, an outer lens provided on the first surface, an inner lens provided on the second surface and corresponding to the outer lens. The outer lens and the inner lens are substantially strip-shaped, the inner lens protrudes towards the light source, the outer lens protrudes away from the light source, light emitted by the light source is firstly scattered by the inner lens, and then is converged by the outer lens and emitted to an external environment.

In one of the embodiments, the inner lens includes a first inner lens and a second inner lens, an outer surface of the first inner lens is a flat surface, and an outer surface of the second inner lens is a convex arc-shaped surface.

In one of the embodiments, the outer lens includes a first outer lens and a second outer lens, outer surfaces of the first outer lens and the second outer lens are both convex arc-shaped surfaces, and the second outer lens is higher than the first outer lens.

In one of the embodiments, the first outer lens includes a plurality of lens portions arranged in rows.

In one of the embodiments, the lens further includes a mounting plate on an edge of the lens body. The mounting plate is configured to be movably connected to a heat dissipation base of an LED lamp.

In one of the embodiments, the outer lens and the inner lens are integrally formed.

An LED lamp is further provided, the LED lamp includes a heat dissipation base, an LED lamp panel including a light source, and the aforementioned lens, a front side of the heat dissipation base is provided with a mounting groove and a sliding groove surrounding the mounting groove and in communication with the mounting groove, the LED lamp panel is received in the mounting groove, and the lens received in the sliding groove and covers the LED lamp panel.

In one of the embodiments, a side surface of an end of the heat dissipation base is provided with an insertion opening located on an end of the sliding groove, the LED lamp further includes a moving member detachably connected to the heat dissipation base, when the moving member is connected to the heat dissipation base, the moving member blocks the insertion opening.

In one of the embodiments, the LED lamp further includes a power supply box fixed to a rear side of the heat dissipation base and a driving power supply fixed in the power supply box.

In one of the embodiments, the LED lamp further includes a power controller and a color temperature controller that are fixed to the heat dissipation base, the power controller includes a switch base, a first electronic switch, and a first toggle, the first electronic switch is fixed to the switch base, the first electronic switch is electrically connected to the driving power supply and the LED lamp panel, the first toggle is connected to the first electronic switch and is configured to be toggled to change a state of the first electronic switch, the color temperature controller includes a switch base, a second electronic switch, and a second toggle, the second electronic switch is fixed to the switch base, the second electronic switch is electrically connected to the driving power supply and the LED lamp panel, and the second toggle is connected to the second electronic switch and is configured to be toggled to change a state of the second electronic switch.

BRIEF DESCRIPTION OF THE DRAWINGS

The drawings are for illustrative purposes only and are only schematic drawings, not physical drawings, and shall not be construed as limiting this patent. In order to better explain the embodiment of the utility model, some parts of the drawings may be omitted, enlarged or reduced, which does not represent the size of the actual product. It will be appreciated by those skilled in the art that some of the known structures and their descriptions in the drawings may be omitted.

DESCRIPTION OF REFERENCE SIGNS

Figure 1:
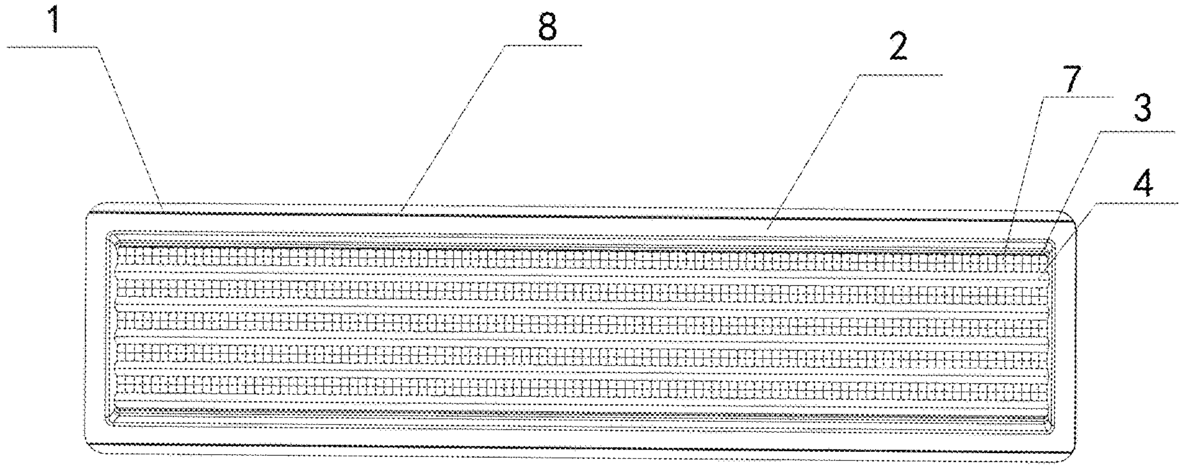
FIG. 1 is a front view of a lens according to an embodiment.

1. Lens; 2. Lens body; 3. First outer lens; 4. Second outer lens; 5. First inner lens; 6. Second inner lens; 7. Lens portion; 8. Mounting plate; 9. Heat dissipation base; 10. LED lamp panel; 11. Mounting groove; 12. Sling groove; 13. Lamp bead; 14. Insertion opening; 15. Moving member; 16. Driving power supply; 17. Power supply box; 18. Power controller; 19. Color temperature controller; 20. Switch base; 21. First electronic switch; 22. First toggle; 23. Second electronic switch; 24. Second toggle; 25. Switch box; 26. First toggle cover 1; 27. Second toggle cover; 28. First surface; 29. Second surface; 91. Middle portion; 92. Side portion.

DETAILED DESCRIPTION OF THE EMBODIMENTS

The technical solution in the embodiment of the present disclosure will be clearly and completely described below in conjunction with the drawings in the embodiment of the application. Apparently, the described embodiments are only some of the embodiments of the application, not all of them. Based on the embodiments in the present disclosure, all other embodiments obtained by a person skilled in the art without making creative efforts shall all fall within the protection scope of the present disclosure.

In the drawings of the embodiments of the present disclosure, the same or similar numbers correspond to the same or similar components. In the description of the present disclosure, it should be understood that terms "upper", "lower", "front" and "rear", "left", "right", "vertical", "horizontal", "lateral", "longitudinal", "top", "bottom", "inner", "outer", and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Figure 2:
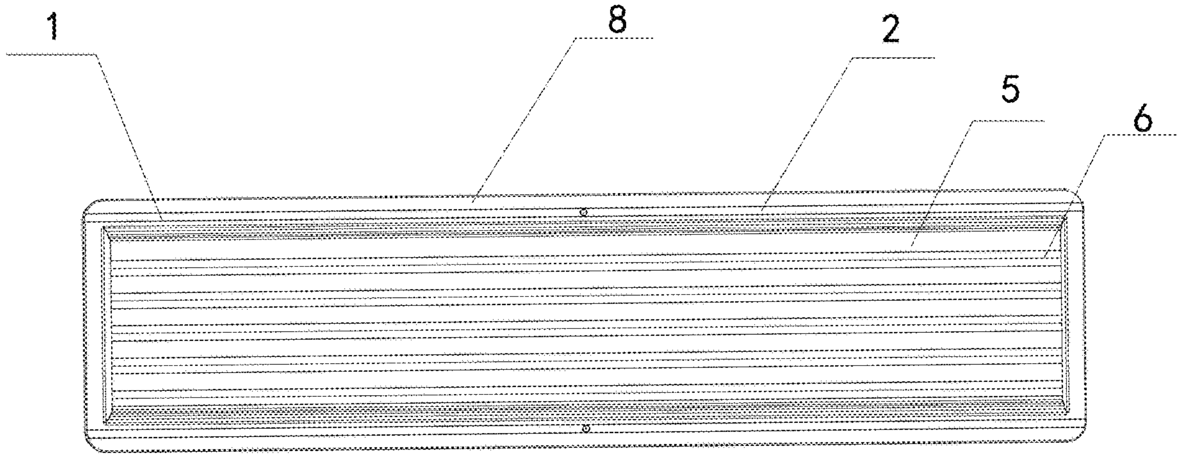
FIG. 2 is a rear view of the lens according to an embodiment.
Figure 3:
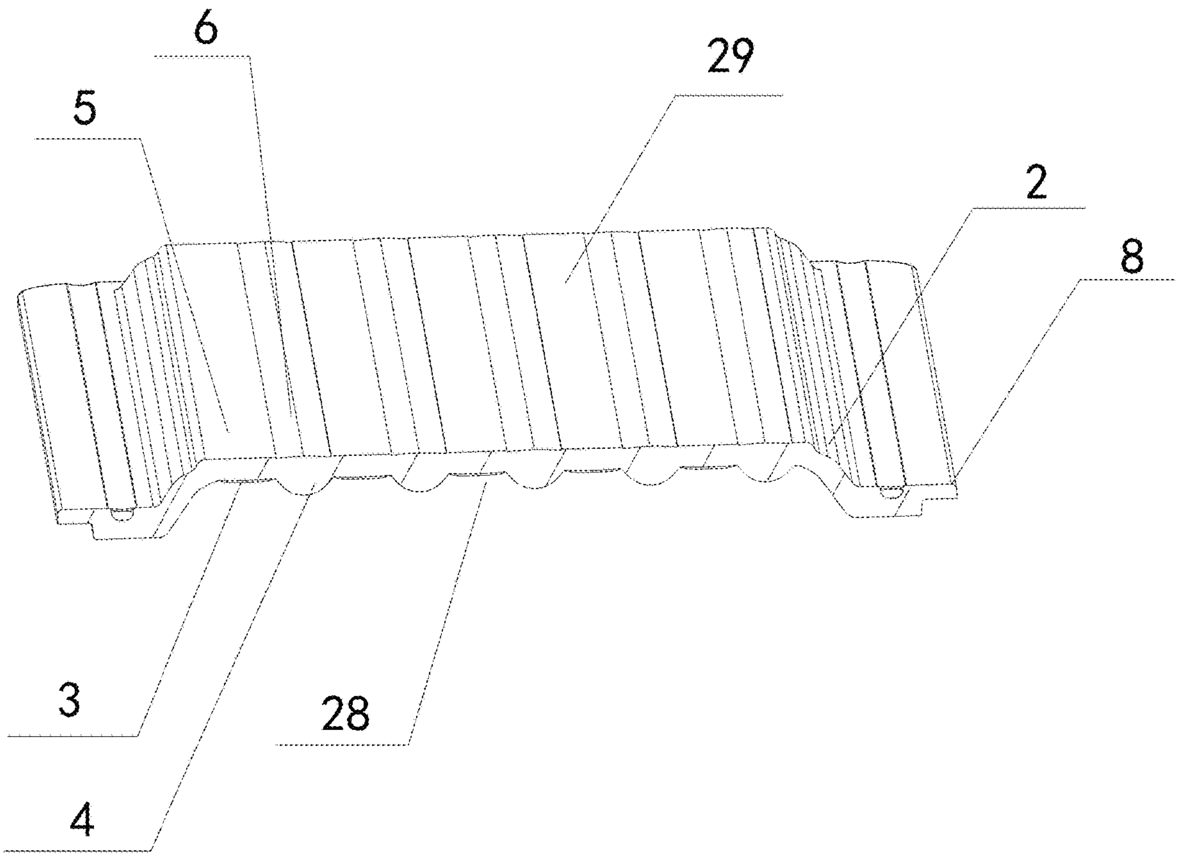
FIG. 3 is a sectional view of the lens according to an embodiment.
Figure 4:
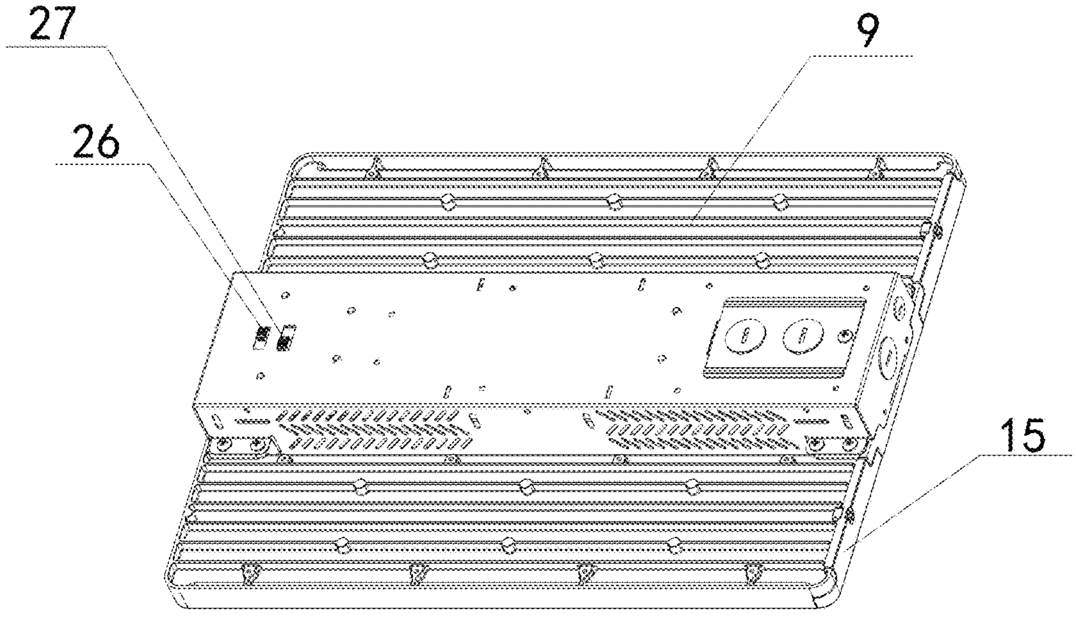
FIG. 4 is a perspective view of an LED lamp according to an embodiment.
Figure 5:
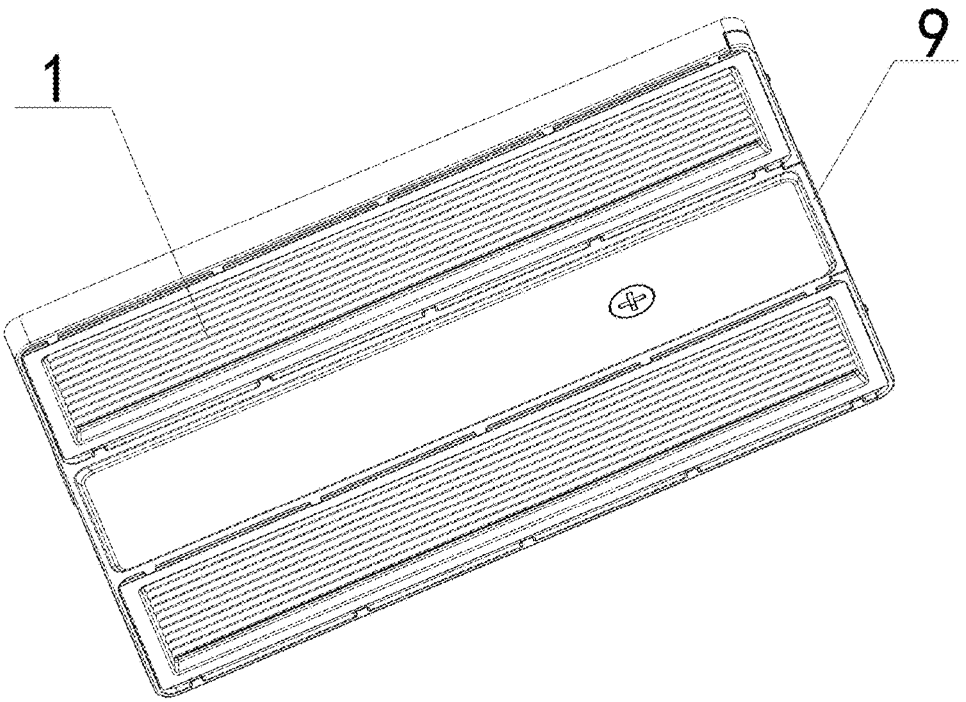
FIG. 5 is another perspective view of the LED lamp of FIG. 4, viewed from another aspect.
Figure 6:
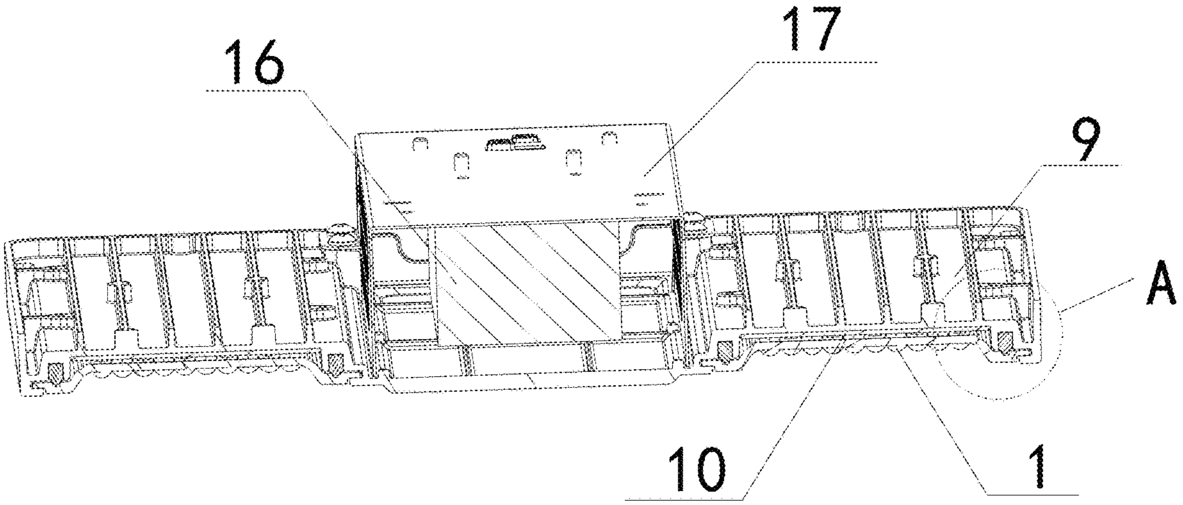
FIG. 6 is a sectional view of the LED lamp of FIG. 4.
Figure 7:
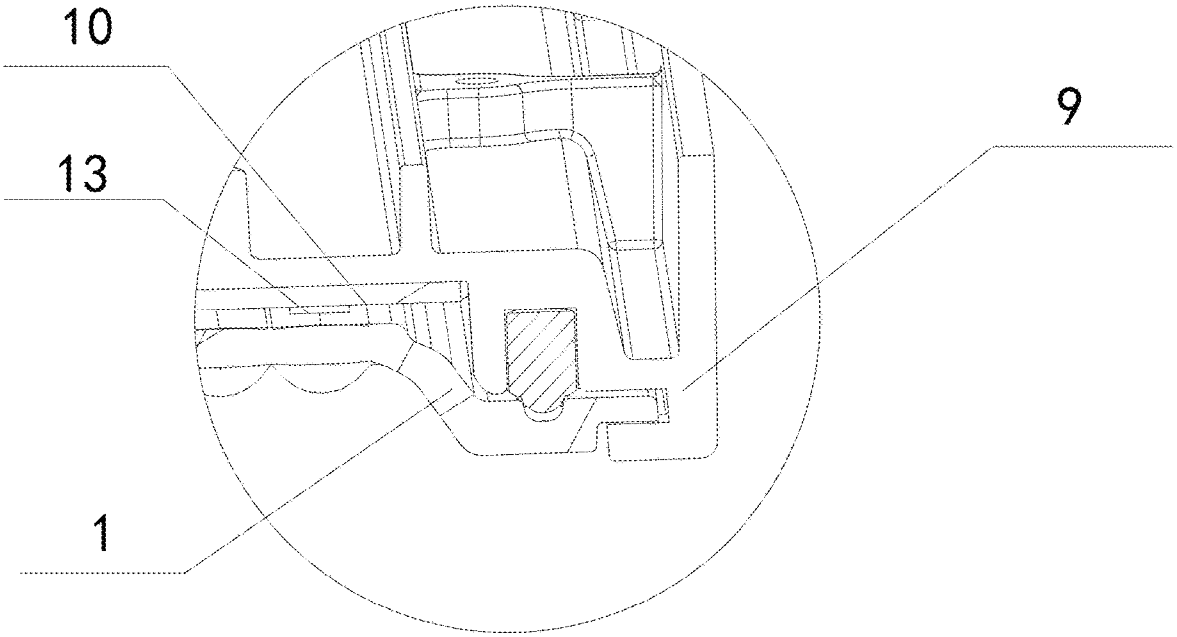
FIG. 7 is an enlarged view of a portion A of FIG. 6.
Figure 8:
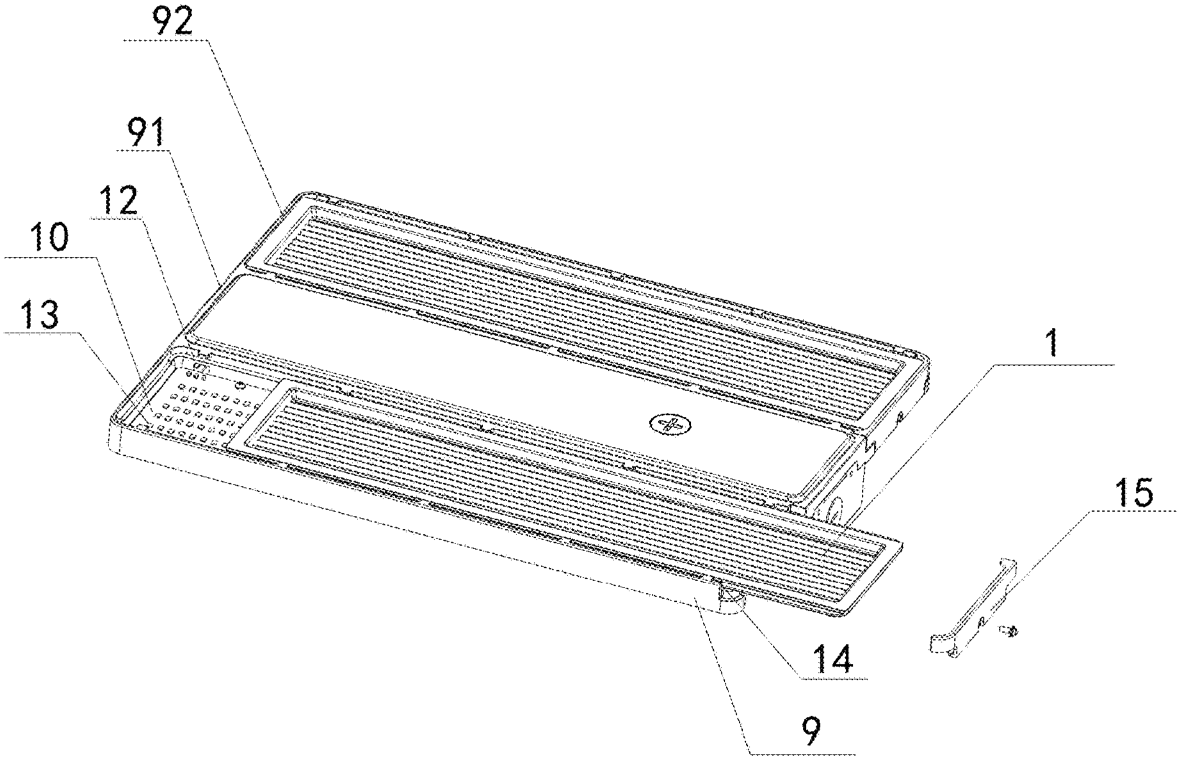
FIG. 8 is an exploded view of the LED lamp of FIG. 4.

Referring to an embodiment of the present disclosure shown in FIGS. 1 to 3, a lens 1 used for cooperating with a light source includes a lens body 2, at least one outer lens, and least one inner lens. The lens body 2 includes a first surface 28 and a second surface 29 that are opposite to each other. The at least one outer lens is provided on the first surface 28. The at least one inner lens is provided on the second surface 29 and corresponding to the at least one outer lens. The outer lens and the inner lens are substantially strip-shaped. The inner lens protrudes towards the light source, and the outer lens protrudes away from the light source. Light emitted by the light source is firstly scattered by the inner lens, and then is converged by the outer lens and emitted to an external environment.

When the light emitted by the light source passes through the inner lens, the light is mixed, that is, the light is scattered, and chromatic aberration is prevented. Since the inner lens is convex towards the light source, that is, the inner lens forms a strip curved surface toward the light source. The light emitted by the light source is refracted through the inner lens to a side of the outer lens away from the light source and mixed together in the middle of the inner lens, that is, the light emitted by the light source is refracted from a middle position of the inner lens on a side adjacent to the light source and from a peripheral position of the inner lens on the side adjacent to the light source to a side of the inner lens away from the light source and refracted to the middle of the inner lens to be mixed. The light after being mixed is uniform without chromatic aberration. Meanwhile, the light after being mixed becomes soft, so that glare can be reduced. The light after being mixed is re-converged through the outer lens, so as to form light without chromatic aberration and satisfying the anti-glare requirement and transmitted to the external environment. Since the light is first scattered by the inner lens, the light will be uniform and soft without chromatic aberration, and then the light converged by the outer lens will be softer and not dazzling. The outer lens is equivalent to a strip-shaped convex lens, the light emitted by the light source is scattered through the inner lens, and the scattered light is re-converged through the outer lens to form more uniform light without chromatic aberration, thereby satisfying the requirements of anti-glare.

The outer lens and the inner lens are integrally formed. Alternatively, the outer lens and the inner lens may be assembled together by two separate elements.

The inner lens includes a first inner lens 5 and a second inner lens 6. An outer surface of the first inner lens 5 is a flat surface, and an outer surface of the second inner lens 6 is a convex arc-shaped surface. The outer lens includes a first outer lens 3 and a second outer lens 4. Outer surfaces of the first outer lens 3 and the second outer lens 4 are both convex arc-shaped surfaces. The second outer lens 4 is higher than the first outer lens 3. The first outer lens 3 includes a plurality of lens portions 7 arranged in rows.

When the light source is arranged below the first inner lens 5, the light emitted by the light source passes through the first inner lens 5, the light is scattered by the first inner lens 5 the first inner lens 5 and then converged by the first outer lens 3, and angles of light reflected by the first inner lens 5 is 45 degrees and 110 degrees. When the light source is arranged below the second inner lens 6, the light emitted by the light source is scattered by the second inner lens 6 and then converged by the second outer lens 4, and angles of the light refracted by the second outer lens 4 is 90 degrees and 90 degrees.

The lens 1 is substantially rectangular. The lens 1 further includes a mounting plate 8 provided on an edge of the lens body 2. The mounting plate 8 is configured to be movably connected to a heat dissipation base of an LED lamp.

As shown in FIG. 4 to FIG. 9, an LED lamp is further provided. The LED lamp includes a heat dissipation base 9 and an LED lamp panel 10. A front side of the heat dissipation base 9 is provided with a mounting groove 11 and a sliding groove 12 surrounding the mounting groove 11 and in communication with the mounting groove 11. The LED lamp panel 10 is received in the mounting groove 11. The lens 1 received in the sliding groove 12 and covers the LED lamp panel 10. The LED lamp panel 10 includes a group of lamp beads 13 at a position corresponding to the first inner lens 5 or the second inner lens 6. A side surface of an end of the heat dissipation base 9 is provided with an insertion opening 14 located on an end of the sliding groove 12. The LED lamp further includes a moving member 15 detachably connected to the heat dissipation base 9. The moving member 15 is fixed to the heat dissipation base 9 by a screw. When the moving member 15 is connected to the heat dissipation base 9, the moving member 15 blocks the insertion opening 14. When the lens 1 needs to be mounted or replaced, the lens 1 can be inserted into or removed from the insertion opening 14 simply by unscrewing the screw and removing the moving member 15 from the heat dissipation base 9 to open the insertion opening 14.

The heat dissipation base 9 includes a middle portion 91 and two side portions 92 located on two sides of the middle portion 91. A spacing is provided between the middle portion 91 and each side portion 92. The LED lamp panel 10 and the lens 1 are connected to the two side portions 92, respectively. The LED lamp further includes a driving power supply 16 connected to the middle portion 91 and a power supply box 17 covering the driving power supply 16. The spacing can isolate the heat from the LED lamp panel 10 and the driving power supply 16, thereby prolonging the service life of the LED lamp panel 10 and the driving power supply 16.

Figure 9:
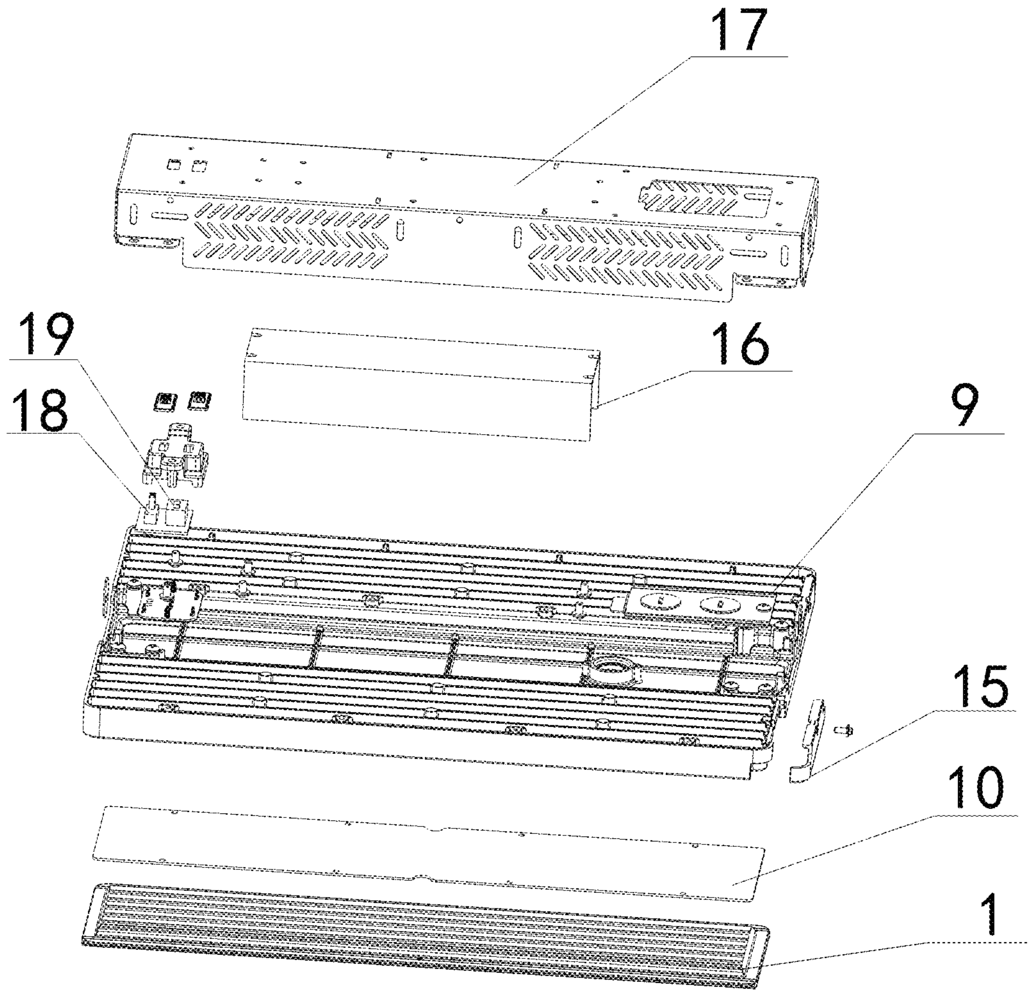
FIG. 9 is another exploded view of the LED lamp of FIG. 4.
Figure 10:
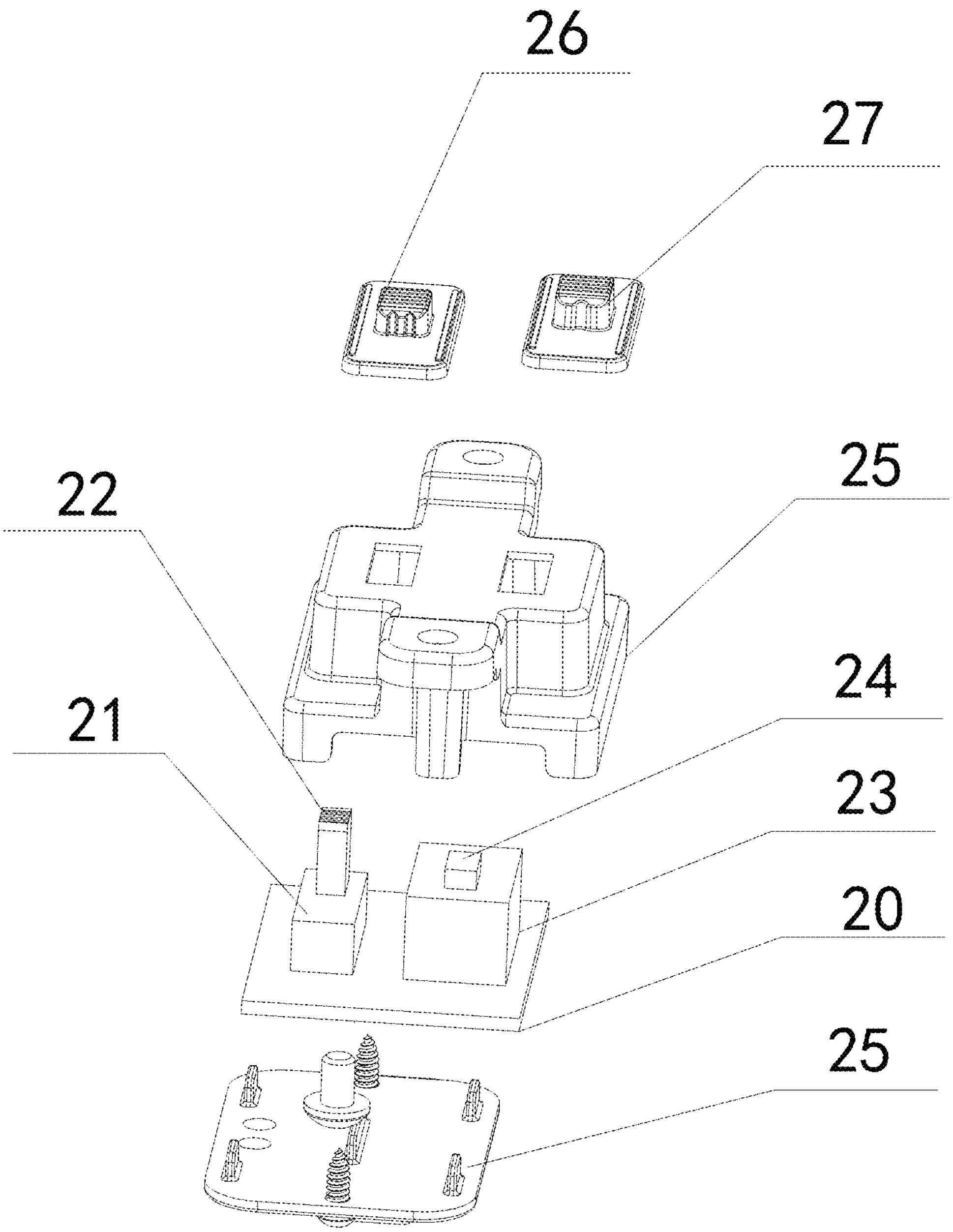
FIG. 10 is an exploded view of a power controller and a color temperature controller.

As shown in FIG. 9 and FIG. 10, the LED lamp further includes switch box, a power controller 18, and a color temperature controller 19. The power controller 18 and the color temperature controller 19 are fixed in the switch box 25, and a bottom portion of the switch box 25 is fixed to the middle portion 91.

The power controller 18 includes a switch base 20, a first electronic switch 21, and a first toggle 22. The first electronic switch 21 is fixed to the switch base 20. The first electronic switch 21 is electrically connected to the driving power supply 16 and the LED lamp panel 10. The first toggle 22 is connected to the first electronic switch 21 and is configured to be toggled to change a state of the first electronic switch 21.

The color temperature controller 19 includes a switch base 20, a second electronic switch 23, and a second toggle 24. The second electronic switch 23 is fixed to the switch base 20. The second electronic switch 23 is electrically connected to the driving power supply 16 and the LED lamp panel 10. The second toggle 24 is connected to the second electronic switch 23 and is configured to be toggled to change a state of the second electronic switch 23.

The power controller 18 further includes a first toggle cover 26 fixed to the first toggle 22. The color temperature controller 19 further includes a second toggle cover 27 fixed to the second toggle 24. An end of the first toggle cover 26 away from the first electronic switch 21 and an end of the second toggle cover 27 away from the second electronic switch 23 extend out of the power box cover 17, so as to facilitate the user to toggle the first toggle 22 and the second toggle 24 through the first toggle cover 26 and the second toggle cover 27.

When the light angle of the LED lamp needs to be adjusted, the specific operation is as follows:

When the lens 1 is mounted or replaced, the moving member 15 is moved away from the heat dissipation base 9 to open the insertion opening 14, so that the lens 1 can be inserted into or removed from the insertion opening 14, and the lens 1 can be mounted or replaced. When the lens 1 of the utility model is used, when the light angle of the LED lamp needs to be changed during use, only the lens 1 needs to be removed from the insertion opening 14 and rotated by 180 degrees, and then inserted into the insertion opening 14, so that the lamp beads 13 of the LED lamp panel 10 correspond to the first inner lens 5 or the second inner lens 6.

When the lamp beads 13 of the LED lamp panel 10 are arranged below the first inner lens 5, the light emitted by the lamp beads 13 of the LED lamp panel 10 is scattered by the first inner lens 5 and then converged by the first outer lens 3, and angles of the light refracted by the first outer lens 3 is 45 degrees and 110 degrees.

When the lamp beads 13 on the LED lamp panel 10 are arranged below the second inner lens 6, the light emitted by the lamp beads 13 of the LED lamp panel 10 is scattered by the second inner lens 6 and then converged by the second outer lens 4, and angles of the light refracted by the second outer lens 4 is 90 degrees and 90 degrees.

According to the LED lamp, the lens 1 can be quickly assembled or replaced, and the operation is convenient. In addition, the lens 1 has two light output angles. When adjusting the light angle of the LED lamp, only the lens 1 needs to be removed manually and rotated by 180 degrees, and then mounted to the heat dissipation base 9 again, so that the light angle of the LED lamp can be changed, thereby saving the cost of the lens 1.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp comprising a heat dissipation base, an LED lamp panel comprising a light source, and a lens cooperating with the light source, the lens comprising:

a lens body comprising a first surface and a second surface that are opposite to each other;

an outer lens provided on the first surface; and an inner lens provided on the second surface and corresponding to the outer lens;

wherein the outer lens and the inner lens are substantially strip-shaped, the inner lens protrudes towards the light source, the outer lens protrudes away from the light source, light emitted by the light source is firstly scattered by the inner lens, and then is converged by the outer lens and emitted to an external environment;

wherein a front side of the heat dissipation base is provided with a mounting groove and a sliding groove surrounding the mounting groove and in communication with the mounting groove, the LED lamp panel is received in the mounting groove, and the lens received in the sliding groove and covers the LED lamp panel;

wherein a side surface of an end of the heat dissipation base is provided with an insertion opening located on an end of the sliding groove, the LED lamp further comprises a moving member detachably connected to the heat dissipation base, when the moving member is connected to the heat dissipation base, the moving member blocks the insertion opening.

2. The LED lamp according to claim 1, further comprising a power supply box fixed to a rear side of the heat dissipation base and a driving power supply fixed in the power supply box.

3. The LED lamp according to claim 2, further comprising a power controller and a color temperature controller that are fixed to the heat dissipation base, wherein the power controller comprises a switch base, a first electronic switch, and a first toggle, the first electronic switch is fixed to the switch base, the first electronic switch is electrically connected to the driving power supply and the LED lamp panel, the first toggle is connected to the first electronic switch and is configured to be toggled to change a state of the first electronic switch, the color temperature controller comprises a switch base, a second electronic switch, and a second toggle, the second electronic switch is fixed to the switch base, the second electronic switch is electrically connected to the driving power supply and the LED lamp panel, and the second toggle is connected to the second electronic switch and is configured to be toggled to change a state of the second electronic switch.

* * * * *